July 5, 1960
G. V. PECK
2,944,196
INSULATING DISC FOR ELECTROLYTIC CAPACITORS
Filed Feb. 18, 1957
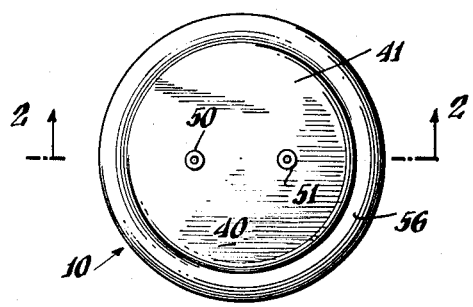
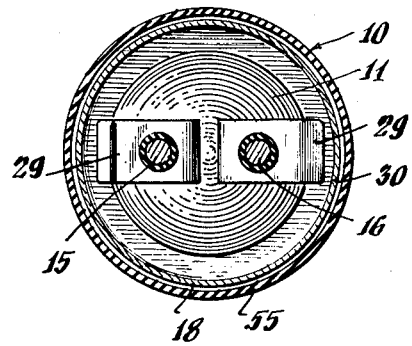
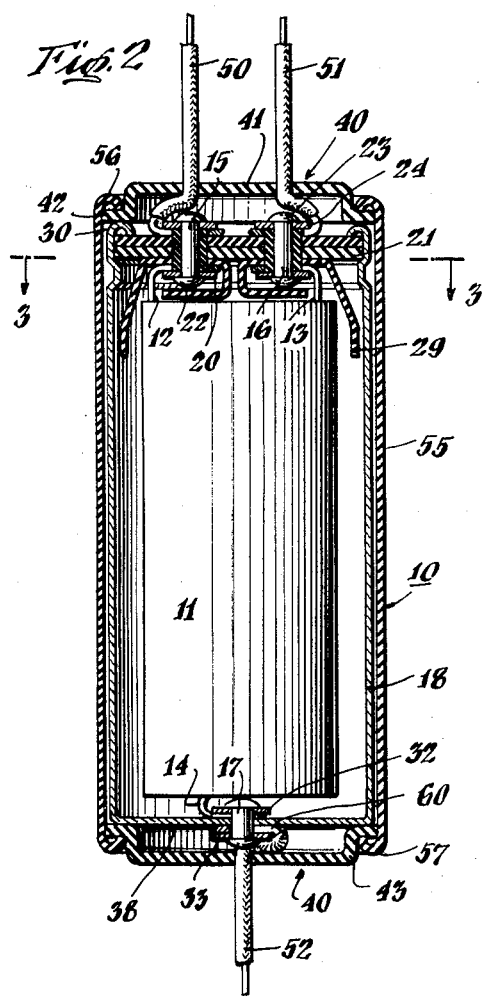
INVENTOR
Gordon V. Peck
BY
ATTORNEY

United States Patent Office 2,944,196
Patented July 5, 1960

2,944,196

INSULATING DISC FOR ELECTROLYTIC CAPACITORS

Gordon V. Peck, Dallas, Tex., assignor to P. R. Mallory & Co., Inc., Indianapolis, Ind., a corporation of Delaware Filed Feb. 18, 1957, Ser. No. 640,681

8 Claims. (Cl. 317—230)

This invention relates generally to electrical devices and has particular pertinency to closure and terminal constructions for electrical devices. The invention is described herein in connection with tubular electrolytic capacitors.

The present invention provides means for protecting and supporting flexible wire leads connected to tubular electrolytic capacitors. Electrolytic capacitors, heretofore, had the problem of providing adequate protection and support means for flexible stranded wire leads connected to the terminals of capacitors.

The necessity for such improved means becomes increasingly important under conditions of vibration and rough handling. To meet these requirements, the capacitor manufacturers have adopted various expedients and types of auxiliary connectors to make an external connection between the stranded flexible lead and its associated capacitor terminal. However, the need has still persisted for a simpler and more economical way of mounting these leads to the condenser terminals. This has now been provided by the present invention. It is, therefore, a general object of the present invention to provide new and improved means of mounting flexible leads to tubular electrolytic capacitors.

Another object of the present invention is to provide a stranded wire lead-in construction for capacitors which can be manufactured at a substantial saving in cost as compared to previous types of lead-in construction.

Still another object of the present invention is to provide a longer lasting connection for stranded wire conductors adapted to be connected to terminals of capacitors.

Other objects of the invention will become apparent from the following description as taken with the disclosure of the accompanying figures of the drawing and wherein:

Fig. 1 is a top plan view of the preferred embodiment of the attaching and supporting construction of the present invention as adapted to efficiently and ruggedly support flexible stranded leads connected to a capacitor terminal;

Fig. 2 is a vertical cross-sectional view of the capacitor, as taken along line 2—2 of Fig. 1, and as adapted to illustrate the mounting construction for the external leads attached to the terminals of the capacitor; and Fig. 3 is a horizontal view of the aforesaid construction shown in Fig. 2 as taken along line 3—3 thereof.

Generally speaking, the present invention discloses novel means for attaching and supporting a flexible wire lead connection to a tubular electrolytic capacitor. The construction, here shown, allows a way to attach a stripped, stranded wire under a rivet head which goes through the capacitor top and is staked over to the capacitor tab internally, thus making the complete connection in one operation. However, it is apparent that if the flexible lead were not supported further, it would possibly fail, under handling during vibration conditions, at the point where the wire is caught under the rivet head because the stranded wire may "splay" and separate at this point.

To preclude such an occurrence, this wire connection point must be protected and strengthened. This has been done by providing a raised covering or cupola configured fibre disc which has each flexible lead threaded through an aperture formed therein so that the point of emergence or egress of the lead from the capacitor outer casing is raised to a position above the lead connection. In this way, the forces of strain and stress put on the lead by handling or twisting are directed away from the point of weakest connection to the relatively firmer and more secure position at the point of emergence from the fibre disc.

The present lead-in connection is used with electrolytic capacitors using a wound capacitor cartridge. The cartridge has a plurality of metal strips or tabs connected to its ends as terminals. The cartridge is positioned within a metal cylindrical casing of which the bottom end is adapted to act as an electrode. A rivet is passed through the bottom end of the casing and is attached to one of the tabs. At the opposite end of the casing there is placed an insulator slab which is held tightly in grooves formed in the annular wall of the casing. The top of the metal casing is crimped over to rest against the insulator slab or closure. A plurality of rivets are passed through the insulator slab and have the tabs of the cartridge connected thereto. The connections to the rivets are made tight by including a washer at both ends of the individual rivets. At the opposite end of the rivets, the stranded leads are brought in to be connected. These leads are stranded conductors which are flexible and have an insulative coating surrounding the strands. These leads are brought in and stripped at a point where connection is made atop one of the washers of the rivets.

Since, it is apparent that when the insulative coating is stripped from the strands of the wire, the connection is weakened, a construction needs to be provided so that any of the bending or twisting forces of the wire are routed to points of stronger construction. This is done by placing a fibre covering or "hat" shaped disc above the rivets. The covering has an annular rim resting on top of the crimped edge of the metal casing. The center of the covering is dome shaped and stepped up from the rim so as to internally form a recess or inner cavity above the rivets and the bare strand connections of the flexible leads. The center of the fibre covering has apertures formed therein so as to allow insulation coated conductors to be threaded therethrough. The insulation bears against the sides of the apertures so that the flexible leads are held therein in an essentially stiff manner whereby abrading and vibration forces are removed from the weaker uncoated lead-in connections to the rivets. An external double open-ended cardboard insulative tube is passed about the metal casing and the fibre covers in a manner such that the open ends of the tube are crimped down against the fibre coverings to tightly grip the same and provide added protection for the capacitor.

Referring now to the figures of the drawing, there is shown a capacitor 10, which comprises a capacitor cartridge 11 disposed within a container 18; the container being a thin-walled, open-ended cup or can composed of aluminum or other suitable material. The cartridge may be of any desired construction; this construction, per se, is not part of the invention and, therefore, will not be further described herein.

The cartridge has a plurality of metal tabs or terminal leads 12, 13, 14 composed of fine wire, narrow strips of thin aluminum foil or other suitable conductive material adapted to be connected to a plurality of rivets 15, 16, and 17 as by means of a washer 20 having an end or head 22. Atop the tabs, on two of the rivets, a sinuated insulator 29 is placed to intrude between the individual tabs and an insulator slab 21 on the capacitor casing. It is seen that the rivets penetrate this slab top 21 so that an end such as 23 of rivet 16 also has a washer 24 placed above an uncoated end of the stranded flexible lead such as 51 which is adapted to be connected externally to auxiliary or associated equipment. The annular wall 30 of the capacitor casing 18 is spun over or crimped on to the closure slab top 21 so as to tightly bear against the same.

In a similar fashion, lower tab 14 of the capacitor cartridge is held by washer 32 to make intimate contact with the bottom of the casing 38 so that it becomes the negative terminal therefor. On the other side of the can, the uncoated portion 60 of the stranded lead 52 is brought in and held thereagainst by means of a second washer 33.

In order to prevent vibration or rough handling of these leads from cutting or fraying them at the rivet connection points that are vulnerable to stress and strain and thus inherently bad for unprotected stranded conductors, it is necessary to buffer these vulnerable points by withdrawing as much of the strains or stresses from this point and to preferably have them applied at the shielded, coated walls of the external leads where by its very nature some of the rubbing force can be dissipated at the protective coating.

Accordingly, a circular cupola-shaped insulative disc or cap 40 comprising a raised central portion 41 lifted up from an annular concentric rim or leg 42 by means of vertical step 43, is positioned at both ends of the capacitor. Each disc is placed adjacent the ends 30, 38 of the capacitor casing. Thus at the top end 30 of the casing, the leg of the cupola disc bears against the rolled edge 29 of the casing. The individual cupola discs are apertured in a manner whereby the coated, stranded leads are adapted to be threaded therethrough with the insulation surrounding the same having a rigidity sufficient to assure that the forces that would normally abrade the uncoated stranded wires are held away from the weakest points so that the sinuated portion contained under the disc will be safely shielded from vibration and abrading damage. A cardboard, or plastic outer container 55 of cylindrical shape is next placed about the entire assembly with both ends 56, 57 being crimped tightly down against the lead supporting discs to form a compact and strong assembly whereby the external stranded leads 50, 51, and 52 are securely mounted and supported while abrasion and damage to the leads are kept to a minimum.

From the foregoing description, it will be evident that there has been provided an improved capacitor structure embodying important features of construction so as to increase the capacitor's usefulness and life duration. However, it is to be understood to those skilled in the art, that various changes and modifications can be made in the preferred form of the invention described herein without departing from the spirit and scope of the invention. Therefore, it is to be understood that the scope of the invention is to be defined rather by the appended claims.

I claim:

1. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said rivet means having tabs connected thereto, a cupola configured fibre disc placed above said rivets through which stranded flexible leads may be passed and connected to the rivets, said disc thus adapted to support said leads as they pass therethrough and help prolong the strength of the connection of said individual flexible leads to said rivet and an open-ended, tubular cardboard container placed over said metal casing, said ends being crimped so as to bear against the insulative caps so as to form a tight capacitor assembly.

2. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said casing being formed so as to hold the closure at the top thereof having capacitor cartridge tabs connected thereto, an annular fibre insulative closure having a center raised portion and a concentric rim placed above said rivets through which stranded, insulated flexible leads may be passed and connected to the rivets, said fibre insulative closure thus adapted to support said stranded leads as they pass therethrough and help prolong the strength of the connection of said individual flexible lead to said rivet.

3. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said casing being formed so as to hold the closure at the top thereof having capacitor cartridge tabs connected thereto, an annular insulative fibre closure having a center raised portion and a concentric rim placed above said rivets, aperture means through which stranded, insulated flexible leads may be passed, said leads having a portion bare to expose the strands as adapted to be connected to the rivets, said insulative closure thus adapted to support said stranded leads as they pass therethrough and help prolong the strength of the connection of said individual stranded flexible leads to said rivets.

4. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said casing being formed so as to hold the closure at the top thereof having capacitor cartridge tabs connected thereto, an annular insulative closure having a center raised portion to form an internal recess thereby joined to a concentric rim and placed above said rivets, apertures therein through which flexible stranded insulated leads may be passed and connected to the rivets, said closure thus adapted to hold and support said stranded leads as they pass therethrough in an essentially firm manner so as to help prolong the strength of the connection of said individual flexible leads to said rivets by withdrawing forces of stress and strain from said connection.

5. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said casing being formed so as to hold the closure at the top thereof having capacitor cartridge tabs connected thereto, an annular insulative fibre closure having a center raised portion to form an internal recess thereby joined to a concentric rim and placed above said rivets, apertures therein through which flexible stranded insulated leads may be passed and connected to the rivets, said closure thus adapted to hold and support said stranded leads as they pass therethrough in an essentially firm manner so as to help prolong the strength of the connection of said individual flexible leads to said rivets by withdrawing strain and abrasive forces from said connection points.

6. A lead-in construction for a capacitor comprising a cartridge therefor, said cartridge having a plurality of tabs connected to the ends thereof, a metal casing within which said cartridge is positioned, the bottom end of said casing adapted to act as an electrode of said capacitor, a rivet in the bottom end of said casing to which one of said tabs is connected, an insulative closure placed at the top of said casing adapted to hold rivet means therein, said casing being formed so as to hold the closure at the top thereof having capacitor cartridge tabs connected thereto, an annular fibre insulative closure having a center raised portion to form an internal recess thereby joined to a concentric rim and placed above said rivets, apertures therein through which insulated stranded flexible leads may be passed and connected to the rivets, said closure thus adapted to hold and support said stranded leads as they pass therethrough in an essentially firm manner so as to help prolong the strength of the connection of said individual flexible leads to said rivets by withdrawing strain and abrasive force from said connection points and a tubular cardboard casing placed around said casing, the ends of the cardboard casing being spun over so as to bear down against the individual insulative closures of said capacitor.

7. A lead-in construction for a capacitor comprising a cartridge therefor, said cartridge having a plurality of metal strips connected to the ends thereof, a metal casing within which said cartridge is positioned, the bottom end of said casing adapted to act as an electrode of said capacitor, a rivet in the bottom end of said casing to which one of said metal strips is connected, an insulator slab placed at the top of said casing, said top being shaped in a manner such as to hold said slab against a portion of said wall with its top end being bent down thereagainst to form a crimped edge, rivet means piercing said slab, said rivet means having individual metal washers placed at both ends thereof, said metal strips of said cartridge being connected to said rivets atop one of said washers insulation means being placed above said metal strips on said rivet means to further protect the same, the opposite end of said rivet having a portion of an insulator coated stranded lead-in wire placed beneath its washer, said portion being stripped of its coating leaving the remainder coated, a fibre covering having apertures cut therein, said covering having an annular rim resting on top of the crimped edge of said casing and with said coated lead-in wire being individually threaded through said aperture of said fibre covering to be tightly yet yieldably held therein in an essentially straight manner so that vibration and abrading forces will tend to be removed from the base wire connection of the lead-in to the rivet terminal of the capacitor, and an outside insulative tube having both ends open-ended adapted to circumscribe said metal casing, with each end of the tube being spun over to tightly grip and bear down against the individual fibre coverings of the capacitor to provide a capacitor construction whose external flexible leads are adapted to be longer lasting and more sturdily maintained.

8. A lead-in construction for a capacitor comprising a cartridge therefor, said cartridge having a plurality of metal strips connected to the ends thereof, a metal casing within which said cartridge is positioned, the bottom end of said casing adapted to act as an electrode of said capacitor, a rivet in the bottom end of said casing to which one of said metal strips is connected, an insulator slab placed at the top of said casing said top being shaped in a manner such as to hold said slab against a portion of said wall with its top end being bent down thereagainst to form a crimped edge, rivet means piercing said slab, said rivet means having individual metal washers placed at both ends thereof, said metal strips of said cartridge being connected to said rivets atop one of said washers, insulation means being placed above said metal strips on said rivet means to further protect the same, the opposite end of said rivet means having a portion of an insulator coated stranded lead-in wire placed beneath its washer, said portion being stripped of its coating leaving the remainder coated, a fibre covering having apertures cut therein, said covering having an annular rim resting on top of the crimped edge of said casing and a center raised portion concentric therewith forming a hollow recess over said rivet means, said coated stranded lead-in wire being individually threaded through said apertures of said fibre covering to be tightly yet yieldably held therein in an essentially straight manner so that vibration and abrading forces will tend to be removed from the base wire connection of the lead-in to the rivet terminal of the capacitor, and an outside insulative tube having both ends open-ended adapted to circumscribe said metal casing, with each end of the tube being spun over to tightly grip and bear down against the individual fibre coverings of the capacitor to provide a capacitor construction whose external stranded flexible leads are adapted to be longer lasting and more sturdily maintained.

References Cited in the file of this patent
UNITED STATES PATENTS

| | | |
|---|---|---|
| 2,160,646 | Coutlee | May 30, 1939 |
| 2,184,686 | Deutschmann | Dec. 26, 1939 |
| 2,202,166 | Peck | May 28, 1940 |
| 2,224,307 | Linder | Dec. 10, 1940 |
| 2,488,763 | Charlin | Nov. 22, 1949 |